United States Patent [19]

Wadensten et al.

[11] 4,197,966

[45] Apr. 15, 1980

[54] AIR BLASTER OR AIR ACCUMULATOR AND QUICK DUMP APPARATUS

[75] Inventors: Theodore S. Wadensten, Wyoming; Alfred Carocci, Johnston, both of R.I.

[73] Assignee: Vibco, Inc., Wyoming, R.I.

[21] Appl. No.: 945,457

[22] Filed: Sep. 25, 1978

[51] Int. Cl.[2] .............. G01F 11/00

[52] U.S. Cl. .............. 222/1; 222/3

[58] Field of Search .............. 222/3, 195, 354, 630, 222/637, 1; 137/202, 204

[56] References Cited

U.S. PATENT DOCUMENTS

| | | | |
|---|---|---|---|
| 3,645,286 | 2/1972 | Follett | 222/3 X |
| 3,788,527 | 1/1974 | Matson | 222/195 |
| 3,799,186 | 3/1974 | Bulin | 137/204 |
| 3,915,339 | 10/1975 | Matson | 222/3 |
| 4,051,982 | 10/1977 | Stetson | 222/195 |

*Primary Examiner*—Robert J. Spar

*Assistant Examiner*—Fred A. Silverberg

*Attorney, Agent, or Firm*—Ralph R. Roberts

[57] ABSTRACT

A container for receiving a charge of pressurized air and storing the air in this container until released through a blast nozzle and having a quick dump valve apparatus within this container. In one embodiment a valve includes a removable pipe which contains a large slidable piston which opens and closes the flow of accumulated air to the discharge. This piston is moved in response to a solenoid actuated small piston which is moved in a small tube. This small tube extends through the large piston and it slides therealong. In another embodiment a ball valve is employed in a tubular chamber. An external three-way quick acting valve actuates the flow of pressurized air to the valve and to a venting to atmosphere. The ball is slightly smaller than the internal diameter of the tubular member so that pressurized air may flow by the ball in a forward position and into the container.

5 Claims, 9 Drawing Figures

AIR BLASTER OR AIR ACCUMULATOR AND QUICK DUMP APPARATUS

BACKGROUND OF THE INVENTION

1. Field of the Invention

With reference to the classification of art as established in and by the United States Patent and Trademark Office the present invention is believed to be classed in the general Class entitled, "Dispensing" (Class 222) and in the subclass entitled, "signal or exhibitor" (subclass 3) and also in the subclass entitled, "with fluent material dispenser" (subclass 96).

2. Description of the Prior Art

It is not new to use air blasting to jar or otherwise assist in the movement or flow of material from bins or the like. Many U.S. Patents and commercial arrangements have produced apparatus in which pressurized air is accumulated in a chamber or tank and then at a desired time is released through a nozzle or pipe in a few milli-seconds into the interior of the bin. Presently, air blasting apparatus includes a receiver tank, a large outlet, a quick dump valve, and a source of pressurized air. This apparatus often is actuated by cutting off the supply of air to the valve which then causes the piston to cycle and release the stored pressurized air in the chamber for a short blast into the bin.

In the known apparatus the actuating mechanism usually is a valve exterior of the tank or container. Often a small amount of pressurized air is discharged into the atmosphere and for blast efficiency is wasted. In the present invention an inexpensive solenoid replaces the more expensive two- and three-way spool valves. The quick dump apparatus is within the tank or container and all pressurized air received into the tank is sent from the large discharge nozzle. The apparatus is of inexpensive construction and may be mass produced and easily repaired.

SUMMARY OF THE INVENTION

This invention may be summarized at least in part with reference to its objects.

It is an object of this invention to provide, and it does provide, an air blaster unit in which the quick dump apparatus is completely within the receiving tank.

It is a further object of this invention to provide, and it does provide, apparatus in which a quick dump piston is moved by pressurized air acting on an outer ring portion on the forward face of the piston.

It is a further object of this invention to provide, and it does provide, a one-way valve which is actuated by a small piston in a centrally disposed small tube. This piston is moved to two limits by a solenoid which is remotely actuated.

It is a further object of this invention to provide, and it does provide, a method of providing and actuating a quick dump valve having a piston movable in response to a small piston and one-way valve.

It is a further object of this invention to provide and it does provide apparatus in which a quick dump apparatus employs a ball freely movable in a tubular chamber. This ball is movable to two limits by a three-way quick actuating valve which is preferably positioned exterior of the chamber.

It is a further object of this invention to provide, and it does provide, a method of actuating a quick dump valve having a ball member freely movable in a cylindrical chamber in response to an actuation of a three-way quick acting valve placed in the inlet supply line of pressurized air.

In brief, in one embodiment the quick dump valve apparatus of this invention provides a tank of determined size and having one large opening into which is mounted the blast nozzle and apparatus. A pipe-type of insert is mounted in this large opening and in this inserted unit is mounted a front retainer ring. A pipe piston is movable in a regular bore of this pipe and at its forward position this piston closes large dump holes through the forward wall of the pipe. This piston at its rearward limit engages a spacer disc having a one-way valve means formed therein. A small tube extends through this pipe piston which is slidable therealong. This small tube has a small tubular seal midlength thereof which forms a stop for a small piston carried in this tube and moved by a solenoid. Pressurized air is fed to this tube from an outside source. At the forward limit of this small piston pressurized air is fed through the tube to the rear of the small piston. Pressurized air passes through holes in the tube and urges the pipe piston forwardly to a close-off condition. This pressurized air flows through the one-way valve and thence to the tank. At its other limit of movement, the small piston shuts off flow of the pressurized air in the tube, exhausts the air to the rear of the pipe piston and discharges this air to the blast nozzle.

In the alternate embodiment, the quick dump valve apparatus employs a ball which is freely movable in a pipe member. This pipe member is closed at its rear by a disc or integrally provided member. A series of discharge holes are formed in the pipe member at a determined distance from the discharge outlet of the pipe member. A tubular sleeve is secured in this pipe member at its forward end and forms a forward sealing stop for the ball. The discharge holes are rearwardly of the tubular sleeve but are disposed to be generally forwardly of the center line of the ball in its forward position. At its rear condition or position the ball closes an inlet to the rear of the pipe chamber. A three-way quick acting valve selectively feeds pressurized air to the pipe chamber through a conduit and in and at another position opens the pipe chamber to atmosphere.

In addition to the above summary the following disclosure is detailed to insure aid in understanding of the invention. This disclosure, however, is not intended to cover each new inventive concept therein no matter how it may later be disguised by variations in form or additions of further improvements. For this reason there has been chosen a specific embodiment of the air blaster and the quick dump apparatus as adopted for use in a pipe mounted in a large discharge and showing a preferred means for the construction of this dump valve apparatus. This specific embodiment has been chosen for the purpose of illustration and description as shown in the accompanying drawings wherein:

BRIEF DESCRIPTION OF THE DRAWINGS

In the following description and in the claims various details are identified by specific names for convenience. The names, however, are intended to be generic in their application. Corresponding reference characters refer to like members throughout the several figures of the drawings.

The drawings accompanying, and forming part of, this specification disclose certain details of construction for the purpose of explanation but structural details may be modified in various respects without departure from the concept and principles of the invention and that the invention may be incorporated in other structural forms than shown.

DESCRIPTION OF THE EMBODIMENT AS SEEN IN FIG. 1

Figure 1:
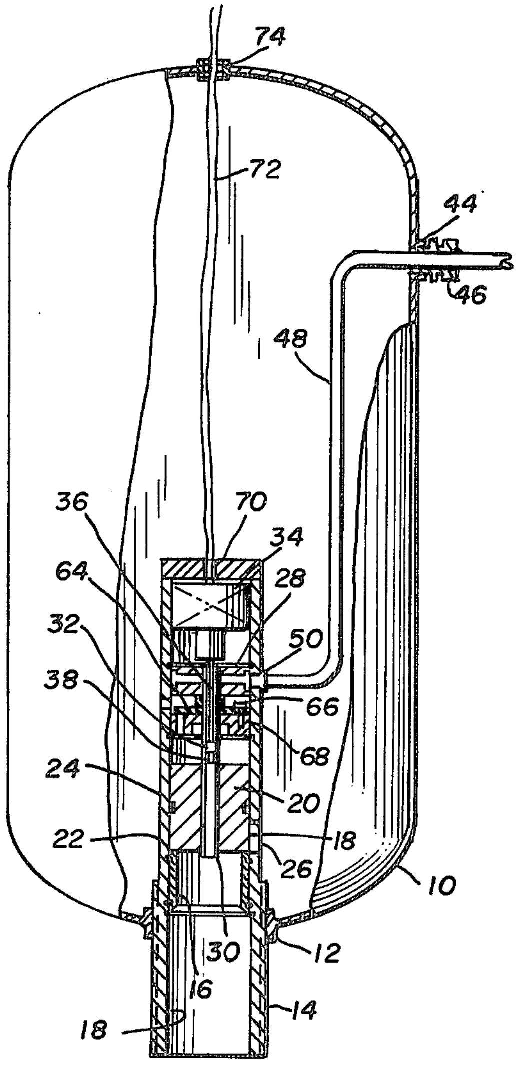
FIG. 1 represents a side view, partly in section, of the air blaster unit of this invention and showing in particular the construction of the quick-release piston apparatus and the solenoid which is actuated to cause this piston to be cycled.
Figure 5:
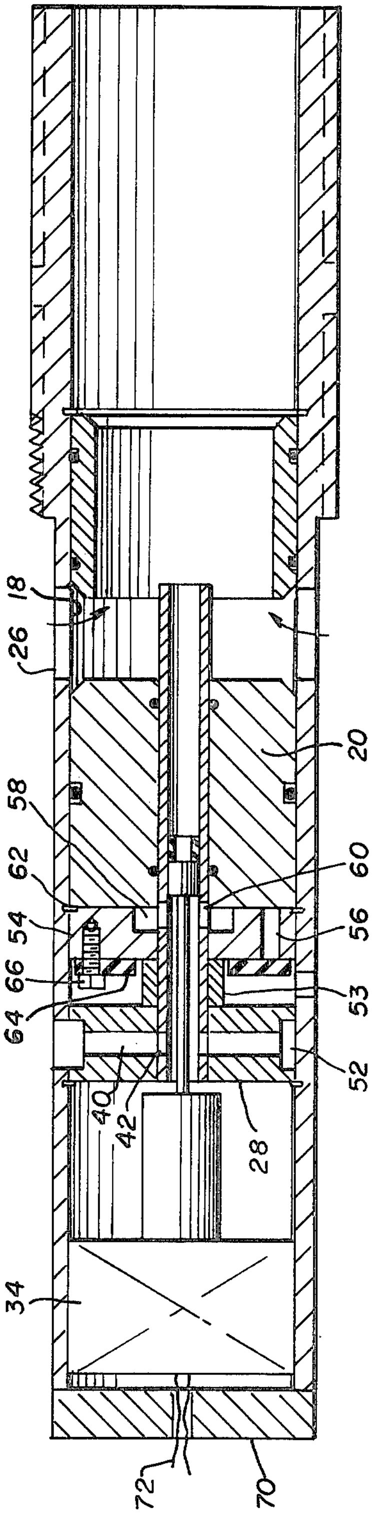
FIG. 5 represents a side view, as in FIG. 2, in which the solenoid is shown as moving the small piston in the tube to a closed condition whereby air is closed to a flow to the chamber until the solenoid is moved, as in FIG. 2, to push the pipe piston in closed condition.

As seen in FIG. 1, a chamber or tank 10 has a forward outlet 12 of rather large size which is threaded to receive a pipe blast nozzle 14. The interior of this nozzle has mounted therein a reduced diameter front tubular sleeve or stop 16 which is sized to produce a press fit within a regular diameter bore portion 18 within which is slidably carried a pipe piston 20. As shown, on the inner or leftward face of the front sleeve 16 is a chamber 22 for a purpose to be hereinafter more fully described. Piston 20 is slidable in the bore 18 of a pipe 14 which has a reduced outer diameter 24. A plurality of large outlet holes 26 are sized and positioned so that these holes 26 are in a plane substantially transverse to the axis of the pipe. When the piston 20 is moved back from in way of these holes, the air in the tank 10 may be readily dumped for a fast discharge through the blast nozzle 12. Near the left end of the pipe 14 and the reduced outer diameter 24 is a header 28 which has a passageway therethrough. A rigid tube 30 is a press fit in this passageway and in the regular bore of this tube is a small diameter piston 32 which is moved in this tube to two limits of position. As shown, a solenoid 34 is connected by a rod 36 to this piston and in response to an electric signal this solenoid is moved from a forward limit, seen in FIGS. 2 and 3, to a rear limit as seen in FIGS. 4 and 5. A small tubular seal 38 is fastened in the bore of this tube 30 and the face of this piston or the piston itself is made sufficiently resilient so that when the piston 32 is moved forwardly or rightwardly to engage the seal 38 it closes the interior of this tube to the flow of pressurized air forwardly of the piston.

BLASTER AS SEEN IN FIGS. 2-5

The header member has a plurality of radially arranged holes 40 which communicate with like holes 42 in tube 30 to carry pressurized air from the outside of the tank to the tube 30. As shown, an inlet 44 in the side of the tank 10 is adapted to receive a commercial fitting 46 which is connected to a flexible tube 48 which provides an air conduit from the outside of the tank to the quick release apparatus. This flexible tube 48 at its inner end is connected by a fitting 50 to the header member 28 in such a manner that pressurized air is fed from an outside source and to holes 40 in the header member. A distributing groove 52 formed in the periphery of header member 28 is shown and is contemplated as carrying pressurized air from the tube 48 to the several holes or passageways 40 and then to the tubular member 30.

A small tubular spacer 53 is carried on the tube 30 and provides a determined spacing between the header member 28 and a spacer disc 54, which disc may be of plastic or metal and is a sliding fit in the regular diameter bore 18. This spacer disc is also a sliding fit on the rigid tube 30 and has a plurality of through holes or passageways 56 formed in its mid area. These holes 56 are adapted for the passage of pressurized air from the right to the left side of this disc. In the right face as viewed and next to its seating on the rigid tube, there is formed in the disc 54 an undercut 58. A plurality of holes 60 are formed in the rigid tube and are disposed to open and flow pressurized air from the interior of the tube 30 to the undercut 58. This undercut is in the face of the spacer disc 54 and the forward outer portion of this disc is engaged and retained by a snap ring retainer 62 which is mounted in a groove formed in the regular diameter bore 18.

Figure 2:
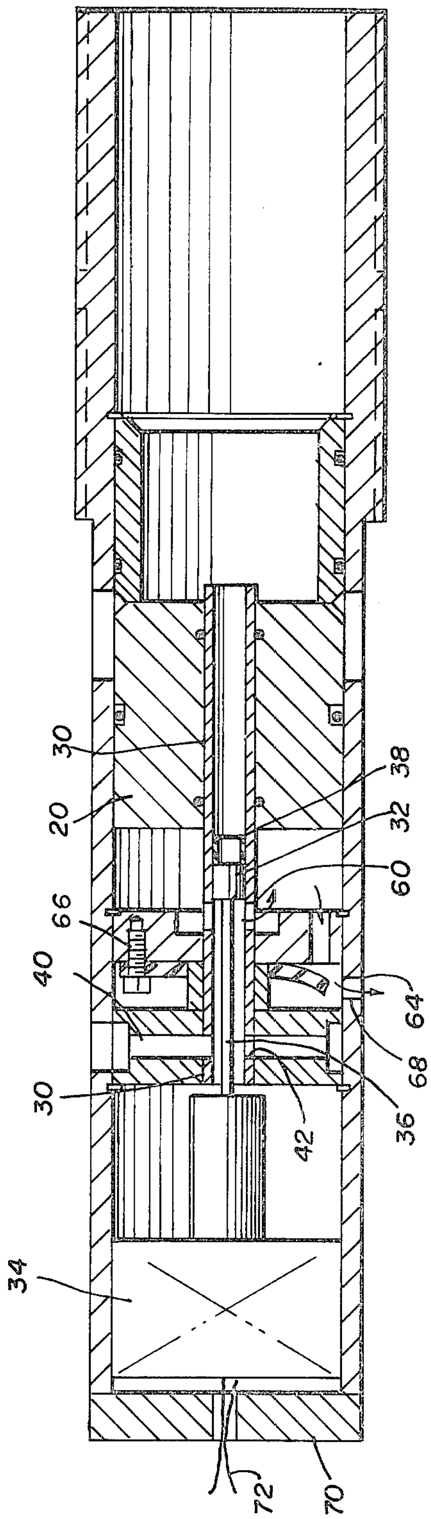
FIG. 2 represents a side view similar to FIG. 1 and in enlarged scale in which the piston is disposed rearwardly with air flowing from the chamber and through the nozzle.

The rear face of the spacer disc 54 carries a flexible disc 64 which is shown as fastened in place by cap screws 66 mounted in appropriately formed threaded holes in disc 54. This flexible disc 64 bends leftwardly, as shown in FIG. 2, when the small piston 32 is at its rightward limit and holes 56 are uncovered and pressurized air flows forwardly in the tube 30. This pressurized air after passing through holes 56 in disc 54 and past deflected flexible disc 64 flows through holes 68 formed in the pipe 14 and then into the tank 10 to pressurize the tank. As and when the small piston 32 is moved to its rearward or left limit as in FIG. 4, the flexible disc 64 closes the holes 56 as pressurized air enters through holes 68 to apply a force on the left face of flexible disc 64 and close hole 56 to a reverse flow of pressurized air.

The solenoid 34 is depicted as carried in the pipe 14 which is closed at its rear end by a disc 70. A pair of electrical conductors 72 usually are in a flexible sheath and extend from the solenoid to and through disc 70 to a pressure-tight connector 74 in a wall portion of the tank 10.

Use and Operation

It is to be noted that the container 10 is usually of steel construction and is rated and tested for a determined p.s.i. of pressurized air. These containers may also be made of plastic and of any desired configuration in either metal or plastic. The large inlet to the container permits the quick dump apparatus to be assembled and tested before mounting in the container and at any later time this apparatus can be removed from ready replacement or repair. This large inlet also permits the outlet pipe or blast nozzle 14 and the quick dump piston 20 to be of a sufficient size to enable a large volume jet blast to flow from the container into the bin.

The pipe thread shown is suggested as a preferred means of securing the pipe 14 and quick dump apparatus in a threaded outlet 12 in the container or tank 10. A flange or a locking taper might also be employed. Whatever the method of mounting it is desirable that the pipe and quick dump apparatus be readily removable and insertable. The pressurized air conduit 48 is preferably a flexible hose or tube and is secured from the outside and usually by a nut to an outlet 46 in the tank or container. The tube and the connection through the wall of the container are made pressure tight. In a like manner the electrical conductors 72 are flexible wires leading to a connector 74 in the container or tank. The connector 74 is a pressure-tight fitting which can be secured from the outside. There are many commercial fittings which may be employed.

The front tubular stop or sleeve 16 is shown as having one or more O-ring outer seals and an outer snap-type retainer ring by which the forward or outward movement of this stop is limited and established. This snap or retainer ring enables this tubular sleeve to be removed for repair or replacement of other components of the quick release apparatus. The front inner edge of this tubular stop is chamfered to reduce the level of noise as pressurized air flows outwardly past the end of the stop. The outer end of the pipe 14 may have flats or grooves formed therein to assist in removing or screwing out the pipe and contained apparatus.

The pipe piston 20 is preferably made of plastic because of weight and inertia. As shown, an O-ring seal is carried by the piston in an outer peripheral groove. This O-ring may be omitted where and when the piston is a reasonably close fit. Small O-rings carried in grooves in tube 30 seal this piston to air flow along the tube. That portion of the face of the pipe piston 20 that engages the rear portion of the front tubular sleeve 16 may have a rubber or similar resilient sealing means.

The spacer disc 54, as shown, has an undercut 58 formed in its front face and establishes a pathway for pressurized air from the small tube 30 through the plurality of holes 42. The outer front face of spacer disc 54 is retained by a snap ring which establishes a back stop limit of the pipe piston. This disc undercut 58 also enables a force source to be produced which utilizes pressurized air flowing through holes 42 to urge the pipe piston 20 forwardly to seal the holes 26. A snap ring carried in a groove formed in the pipe establishes the forward position of the spacer disc 54 while a small tubular spacer 53 carried by and on the tube and between the spacer disc 54 and header member 28 keeps these two members at a determined spacing.

The flexible disc or seal 64 is normally made of sheet material die cut to the desired configuration and with apertures therein for the passing through of cap and retaining screws 66. This flexible disc may be of rubber or plastic and is preferably about thirty Durometer. Rather than screws 66, adhesive may be used to secure the flexible disc to the spacer disc so that the flexible disc is brought into close proximity of the holes 56 formed in the spacer disc. Rather than one disc, a plurality of flexible portions can be provided as long as each hole 56 is covered and flow of pressurized air therethrough is stopped when the small piston is moved in the tube to cut off flow to the outlet holes 60 in the tube.

The rigid tube 30 may be of metal or plastic. The outer surface along which the pipe piston moves is a reasonably constant diameter so that loss of pressurized air along the tube and by the pipe piston 20 is kept to a minimum. The bore of this tube is also of a constant diameter along the tube portion in which the piston 32 is moved by the solenoid 34. The small tubular seal 38 may be of metal or plastic and is secured in place by pins, adhesive or other means. At its forward limit the piston 32 engages this seal 38 to shut off the flow of air to and through the bore of the small tube. This small piston 32 may be of metal with a resilient face portion of plastic or of rubber or a combination of these materials.

The header member 28 may be of plastic or metal. Once installed this member is relatively immobile in the pipe. A snap ring and groove is provided in the pipe bore 18 at the rear of this member. In cooperation with the spacer disc 54 and spacer member 53 a snap ring and groove at the front of this spacer disc establishes and positions these components in the pipe 14.

The conduit inlet 50 through the wall of the pipe contemplates a removable connection of commercial construction. The outlet of this connection feeds pressurized air to the header member 28. As shown, in addition to the radially arranged holes 40 there may be an outer distributing groove 52 adapted to carry pressurized air from the fitting 50 to the several drilled holes 40 leading to the holes 42 in the tube 14. Although not shown, a distributing groove may be formed in this header member at its inner diameter. Such an inner groove eliminates the necessity of alignment of the radially disposed holes in the header member with the small inlet holes 42 in the tube 30.

Operation of Quick Dump Apparatus of FIGS. 2–5

In FIG. 2, the pressure tank has just emptied and the solenoid has moved the piston 32 forwardly to the tubular seal 38. Holes 60 in tube 30 are now uncovered and pressurized air flows through the conduit 48 through the holes 40 to the header 28 and into and through the tube 30 to holes 60 formed therein. This pressurized air fills first the small undercut 58 in the face of the spacer disc 54 and then a developing chamber behind pipe piston 22, which is thus moved forwardly toward and to tubular sleeve 16 to close outlet holes 26. After the piston has moved to its forward limit and the area chamber to the left of this piston 20 has approached or is equal to the pressure in the conduit 48, the pressurized air flows into the tank.

Figure 3:
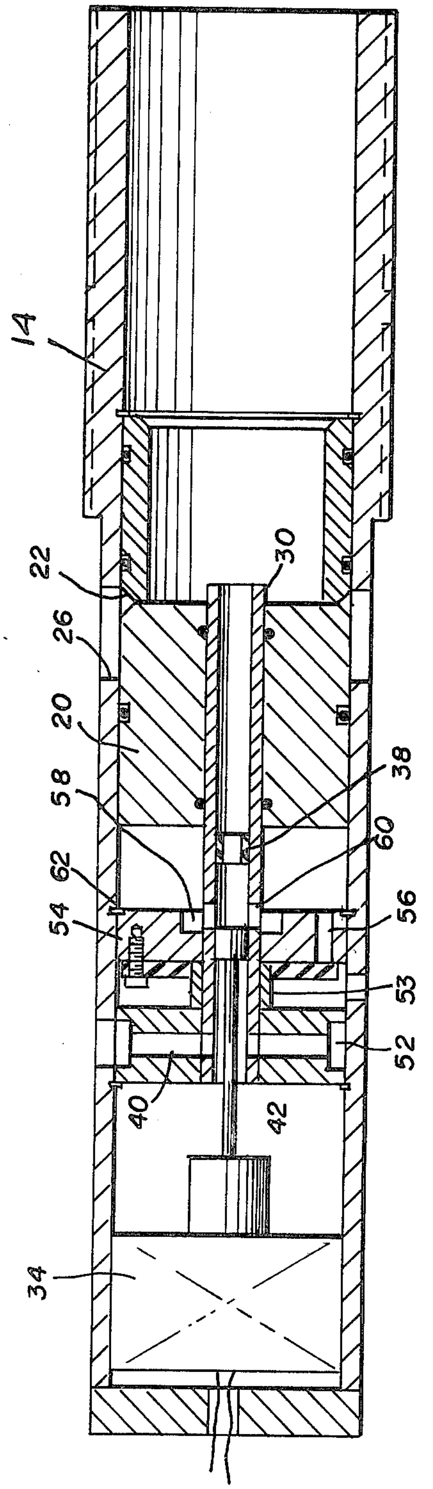
FIG. 3 represents a side view similar to FIG. 2 and depicting an actuation of the solenoid to push forwardly a small piston associated with the solenoid so that it opens a flow of pressurized air to the interior of the chamber and also produces air pressure on the interior side of the quick moving piston so that this piston is moved to close the quick dump holes from the blast chamber.
Figure 4:
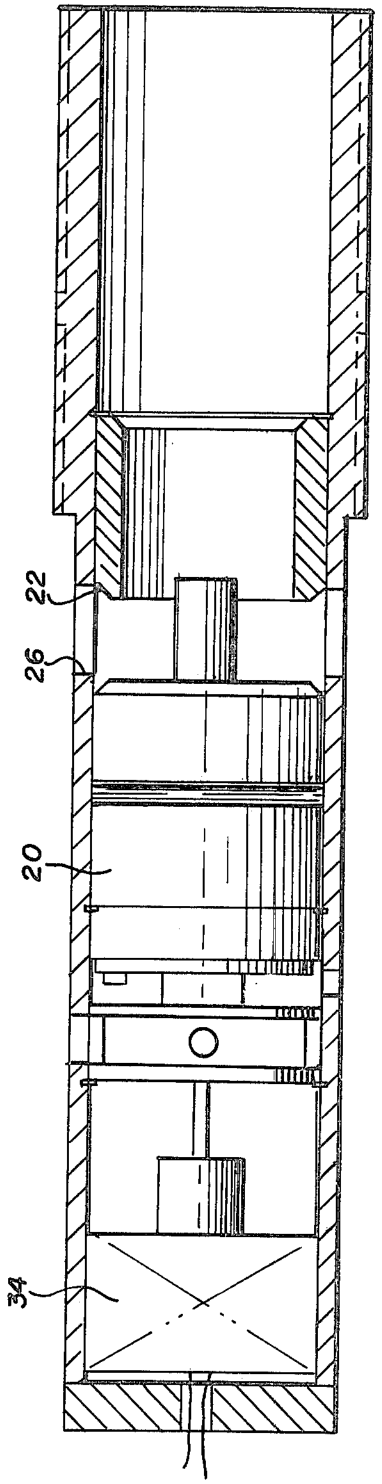
FIG. 4 represents a side view, as in FIG. 2, in which the small piston is moved to the rear by a solenoid and provides a quick blast or quick dumping of the pressurized chamber.
Figure 6:
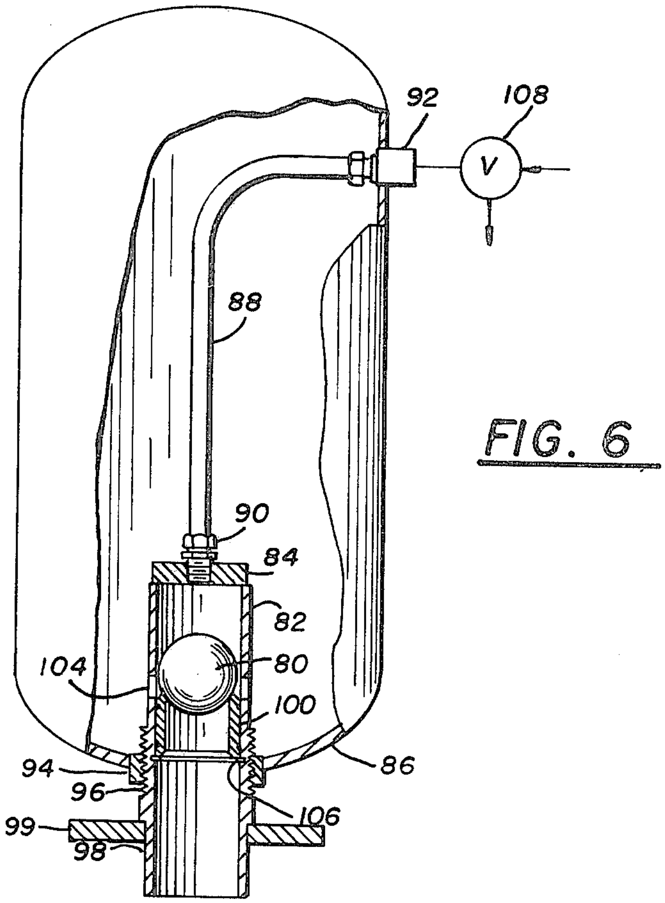
FIG. 6 represents a side view, partly in section, of an alternate construction of an air blaster or quick dump apparatus which employs a freely moving ball in a tubular chamber.

In FIG. 3, the piston is shown as moved to the right to seal off discharge from the tank through holes 26. Pressurized air to the rear of piston 20 now flows through holes 56 in the spacer disc 54 and bends the flexible disc 64 allowing pressurized air to flow into that space between the header member and the spacer disc. This pressurized air flows from this space through holes 68 and into the now closed tank to bring this tank to the desired pressure of air.

After a determined interval of time during which the tank becomes pressurized, the solenoid 34 is actuated to draw the small piston 32 to the position seen in FIG. 4. This piston moves to the left or rearwardly of the holes 60 and shuts off the flow of pressurized air from the conduit 46 to and through the tube 30. Air from the area immediately to the left or rear pipe piston 20 flows to the holes 60 and thence rightwardly through the tube 30 and through the discharge outlet. The pressurized air in the tank flows through holes 68 into the space immediately to the left or rearward of the flexible disc or seal 64 to cause this disc or seal to close through holes 56. The reduced pressure to the rear of pipe piston 20 and the chamfered portion at the front outer edge adjacent this piston causes a rearward fast movement of this piston to the position as seen in FIG. 5. This uncovers holes 26 in pipe 14 permitting a quick dump or blast of the pressurized air in the tank or container 10 to flow out of the large open end of pipe 14 into the bin, not shown. That air in the area between the header 28 and the spacer disc 54 flows from this space into the tank and becomes equalized with the pressure in the tank 10.

In FIG. 5 is seen the apparatus in the quick dump condition with the piston 20 adjacent to the spacer disc 54. Holes 26 are uncovered and the small piston 30 blocks flow of pressurized air from the header 28 into the tank. After a determined time interval or pressure drop in the tank, the solenoid is actuated or deactiviated to move small piston 30 forwardly to the position, as shown in FIG. 2, and the cycle above-described is repeated.

As a Method

As a method the apparatus of FIGS. 1 through 5 provides for the receiving and storing of a charge of pressurized air in a container of a determined and selected size; providing and positioning a blast nozzle at one end of this container; quick releasing the accumulated pressurized air from the container through this nozzle by means of a quick dump valve apparatus positioned within this container, said quick dump valve including a removable pipe within which is removably mounted a slidable large piston which is freely movable to two limits, at the forward limit the piston closes the valve to a flow of pressurized air from the container, and at the rear limit the piston uncovers outlet holes formed in the removable pipe to quick release the pressurized air from the container; actuation of the movement of this large piston is by reciprocation of a small piston by a solenoid, this small piston being movable in a small tube extending through the large piston which slides therealong.

Alternate Embodiment of FIGS. 6 thru 9

Referring next and finally to the drawings and FIGS. 6 through 9, there is depicted a quick dump valve apparatus in which a ball 80 is freely movable in a tubular member 82. An end closure disc 84 is shown as welded or brazed to the left end of this tubular member 82 to seal this end to passage of any and all pressurized air in the blaster except that which is carried into the chamber or tank 86 by and through flexible conduit 88. A connector 90 secures the inner end of this conduit 88 to a threaded passageway formed in this disc 84. The other end of this conduit is secured to a commercial fitting 92 attached to the outer wall of the tank 86.

The right end of the tank 86 has a threaded collar 94 welded to an opening formed therein. The tubular member 82 has a short length of exterior threads 96 adapted for an air-tight removable mounting of this tubular member in the collar 94. Flats or grooves 98 provide grasping means for the removal of this tubular member 82 from the connector 94. The member 82 and tank 85 may be mounted in and to the sidewall 99 of a bin or tank which has material to be removed by an assist of an air blaster. A retaining ring or sleeve 100 is insertable into the open end of the member 82. O-rings 102 provide a dual purpose for the insertion and mounting of this sleeve 100 in the tubular member. These rings are retained in grooves formed in said sleeve 100 and insure that the sleeve is a tight fit in the tubular member as well as providing a seal against the flow of pressurized air in any space that may occur between the bore of member 82 and the exterior of the sleeve 100.

The inner end of the sleeve is formed with an inner chamfer to provide a sealing surface and a seat for the ball 80 when moved tightly thereagainst. An outer chamfer is also formed on the inner end of this sleeve member. This chamfer cooperates with holes 104 formed in the tubular member 82 for conducting pressurized air to and from the closed tank 86. A snap ring 106 is mounted at the end of this sleeve 100 to retain this sleeve axially in the tubular member 82. In practice, this groove for the snap ring is formed by making the front threaded portion of the tubular member of a commercial fitting and the inner tubular portion of a separate tubular member and welding them together with a groove space for the snap ring. This is a construction bonus but the member 82 can be made as one piece and even the end closure 84 can be made as an integral portion, if desired.

Figure 7:
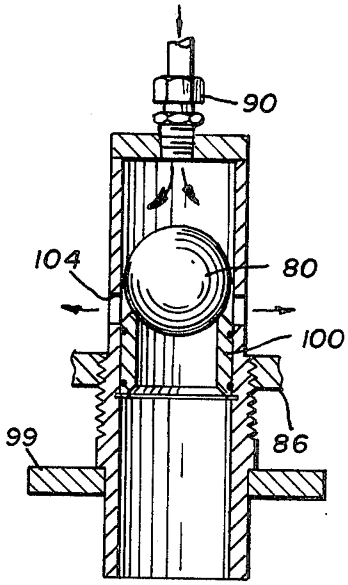
FIG. 7 represents a fragmentary sectional side view of the valve apparatus of FIG. 6 and showing the ball in the forward and air flow closing condition.
Figure 8:
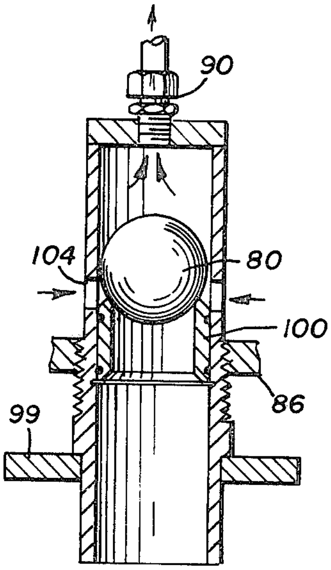
FIG. 8 represents the side view of FIG. 7 with the pressurized air at the time of its cut off of inlet flow and showing the direction of air movement.
Figure 9:
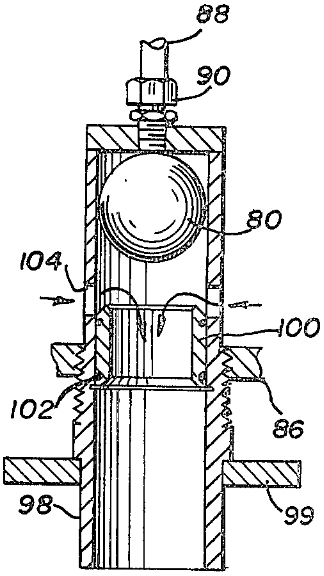
FIG. 9 represents the side view of the ball valve of FIG. 6 with the ball moved to its rear condition whereby a quick dump of that pressurized air in the chamber occurs.

Operation as in FIGS. 7, 8 and 9

Preferably exterior of the tank 86 is a quick acting three-way valve 108 which controls the flow or pressurized air to and through the conduit 88. In FIG. 7 this valve is manipulated so that pressurized air enters through conduit 88 and into the rear or left end of the tubular chamber provided by the member 82 and closure disc 84. This inflow of pressurized air causes ball 80 to move rightwardly and into a sealing condition against the inner chamfer of sleeve 100. The ball 80 is free floating in this tubular chamber and the ball is sized so that a determined amount of pressurized air may flow past the outer diameter of this ball. As a practical matter for a discharge of about two inches, the ball is two inches (50.8 mm.) in diameter and the bore of the tubular chamber is made about one thirty-second of an inch (0.79 mm.) larger so that about one-quarter square inch (6.35 mm.) area excess is provided in the tubular member. It is to be noted in FIG. 7 that when the ball 80 is fully forward the center of the ball 80 is at or about at the rear of the hole openings 104 provided in the tubular member 82. The pressurized air flows in the direction as indicated by the arrows and around the ball to fill the tank 86.

Operation as in FIG. 8

In FIG. 8 the three-way valve 108 has been actuated to cut off the flow of pressurized air to the conduit 88. The conduit 88 through valve 108 has been opened to atmosphere. The flow of pressurized air is as depicted by the arrows. The pressurized air in the tank moves through the holes 104 and because these holes and the pressurized air are directed against the forward curve of the ball 80 it, the ball, is urged rearwardly.

Operation as in FIG. 9

In FIG. 9 is depicted the quick dump apparatus with the ball 80 moved to the rear of the tubular chamber 82. The pressurized air in the tank 86 flows through the holes 104 past and through sleeve 100 as a blast from the outlet of the tubular member. The ball 80 has moved leftwardly or rearwardly to cover and close the inlet in and through the disc 84. Atmospheric pressure on one side of the ball and pressurized air on the other side of the ball cause the ball 80 to move to the position as shown in FIG. 9.

The ball 80 is made to be a loose fit in the tubular member and whether the blaster is a two inch (50.8 mm.), a four inch (101.6 mm.) or a six inch (152.4 mm.) or some other size, the ball is made as a loose fit so as to provide about one-eighth to one-quarter square inch area differential. The holes 104 are positioned so that the pressurized air engages the forward portion of the ball when the air is flowing from the tank 86 and the conduit 88 is vented to atmosphere.

Actuation of the air blaster is achieved when the quick acting three-way valve 108 (either manual or electric) is shut off and the high pressure air stored in the tank 86 is released. As in FIG. 9, the air in the tank tries to escape and flows from the tank to and through holes 104. A small portion will flow past the loose fitting ball 80 to and toward conduit 88 and will move ball 88 in that leftwardly direction. The escape area around the ball 80 is much less than the area of the exhaust provided by the outlet through the sleeve 100, thus the pressurized air flows quickly from the tank. The differential pressure in the tank and the conduit when open to the atmosphere acts to cause the ball to move leftwardly. As and when the ball moves leftwardly, it closes the conduit outlet to the interior of the tubular chamber 82.

When the blast has been completed and the pressurized air in the tank has nearly exhausted the tank, the valve 108 is again manipulated to cause high pressure air to again flow in conduit 88. Ball 80 is pushed forwardly to the position of FIG. 7 where the ball again seats on the chamfer of sleeve 100 to prevent flow from the outlet and pressurized air flows around the ball 80 to and through the holes 104 to the interior of the tank 86. A new charging cycle is thus begun.

This alternate embodiment employs a ball 80 rather than a piston. This ball is freely movable in the tube and does not require sealing means such as O-rings to achieve a sealing of the large outlet. The filling of the tank and the exhausting from the tank 86 is through the same grouping of holes 104. Other known devices have the inlet and exhaust from the tank through different holes or openings. Balls are less expensive in the manufacture of the blaster apparatus as above described.

In both of the embodiments shown and described it is to be noted that the piston or ball is carried in and is moved in a tubular member that extends from the discharge to the inner end. In U.S. Pat. No. 3,788,527 the discharge tube terminates within the chamber and the tubular member carrying the piston is made of an enlarged diameter so that pressurized air within the chamber exits through a series of air inlet means adjacent the inner end of the tube. This is not employed nor suggested in the discharge holes as formed in the tubular portion of the embodiments of this application.

It is also to be noted that in the embodiment employing a ball that a chamfered sleeve or O-ring may be placed at or near the closure end 84. This inner end sealing sleeve means would then eliminate the requirement for the ball to move in way of the pressurized air inlet of the tube or conduit 88. Pressurized air also may be fed to the tubular chamber in a manner as shown in FIG. 1 and employs a side connection rather than an inlet through the center of the closure disc 84. The ball in its rearward movement would then engage this rear sleeve or O-ring to essentially shut off the flow of pressurized air from the tank and to the conduit now open to atmosphere. Instead of a snap ring 106, a transverse pin or any other securing means may be used. The ball and the forward sleeve and, where used, a rear sleeve are made so as not to have a locking taper as it is desired that the ball be freely movable.

As a method the apparatus of FIGS. 6 through 9 provides for the receiving and storing of a charge of pressurized air in a container of a determined and selected size; providing and positioning a blast nozzle at one end of this container; quick releasing the accumulated pressurized air from the container through this nozzle by means of a quick dump valve apparatus positioned within this container, within which is removably mounted a freely movable ball which is movable to two limits, at its forward limit the ball engages and seats against a tubular sleeve within the pipe and as the ball is seated it closes a large discharge from the container to a flow of pressurized air from that stored within the container, and at its rear limit of movement the ball uncovers holes formed in the removable pipe to permit and effect quick release of the pressurized air from the container, and manipulating a three-way valve by which pressurized air is fed to the rear of the removable pipe through a conduit mounted in the container, the inflow of pressurized air through this valve and to the pipe causing the ball to move forwardly to close the discharge outlet of the pipe and the closing of the three-way valve to pressurized air and venting of the rear of the pipe to atmosphere causing the pressurized air in the tank to engage the front portion of the ball and move the ball to the rear of the pipe and uncover the discharge holes and outlet while substantially closing the conduit to a flow of pressurized air in the tank past the ball.

Terms such as "left," "right," "up," "down," "bottom," "top," "front," "back," "in," "out" and the like are applicable to the embodiment shown and described in conjunction with the drawings. These terms are merely for the purposes of description and do not necessarily apply to the position in which the quick dump valve and air blast apparatus may be constructed or used.

While a particular embodiment of the air blaster has been shown and described it is to be understood the invention is not limited thereto since modifications may be made within the scope of the accompanying claims and protection is sought to the broadest extent the prior art allows.

What is claimed is:

1. An air accumulator and quick release apparatus for producing a blast of air into a storage means for material which is not always free flowing and requires an assist, said apparatus including: (a) a pressure tank having a large outlet at one portion thereof; (b) a removable mounting carried in and by the large outlet, the mounting carrying a quick release apparatus within the pressure tank and with said mounting insertable and removable within the tank through the large outlet; (c) the mounting including a pipe portion having a smoothly formed bore of regular diameter; (d) a front tubular stop carried in said pipe portion and near the outwardly extending end of the pipe portion; (e) a multiplicity of discharge holes formed in said pipe, said holes arranged in a plane substantially transverse to the axis of the smoothly formed bore and with the outer facing edges of the holes adjacent and upstream of the front tubular stop; (f) a ball freely movable in said bore and of a larger diameter than the front tubular stop, said ball of a diameter which is less than the diameter of the pipe portion to provide a flow path for pressurized air past the ball and a forward movement of this ball to cause the ball to engage the tubular stop to close the pipe portion front outlet to a flow of pressurized air with the discharge holes being forwardly of the center line of the ball in the forward position; (g) a rear end closure of the pipe portion; (h) an air inlet means connected to said pipe portion and with said front outlet disposed downstream of the ball when said ball is in its most rearward condition, the air inlet supplied by pressurized air through a conduit extending from the outer surface of the pressure tank; (i) rear sealing means disposed in the pipe portion so that as and when the ball is moved upstream the ball substantially shuts off flow of pressurized air from the tank to the conduit, and (j) a quick acting three-way valve disposed so as to receive pressurized air from a supply and feed it to the conduit within the tank whereupon the ball is moved downstream to close the large outlet of the pipe portion and to allow the pressurized air to flow around the downstream positioned ball and through the discharge holes into the tank to charge said tank, and when a quick dump or blast is to be made the three-way valve is manipulated to shut off pressurized air to the conduit and to open said conduit to the atmosphere, the pressure in the tank engages the front surface of the ball to urge it, the ball, upstream fully uncovering the discharge holes and the forward outlet and with the ball engaging the rear sealing means to substantially close the conduit to unwanted rearward release of pressurized air from the tank.

2. An air accumulator and quick release apparatus as in claim 1 in which the air inlet is brought to and through the end member by which the inner end of the pipe member is closed.

3. An air accumulator and quick release apparatus as in claim 1 in which the front tubular stop has a chamfer adapted to provide a seating face for the curvature of the ball.

4. An air accumulator and quick release apparatus as in claim 1 in which the ball is made so that its cross sectional area is about one-quarter square inch less than the cross sectional area of the bore of the pipe portion within which the ball is moved.

5. A method for the receiving and storing a charge of pressurized air in a container of a determined and selected size, the method steps including: (a) providing and positioning a blast nozzle at one end of this container, (b) quick releasing an accumulation of pressurized air from said container through this nozzle by means of a quick dump valve apparatus positioned within this container, said quick dump valve including a removable pipe within which is removably mounted a freely movable ball which is movable to two limits, at its forward limit the ball engages and seats against a tubular sleeve within the pipe and as the ball is seated it closes a large discharge from the container to a flow of pressurized air from that stored within the container, and at its rear limit of movement the ball uncovers holes formed in the removable pipe to permit and effect quick release of the pressurized air from the container, and (c) manipulating a three-way valve by which pressurized air is fed to the rear of the removable pipe through a conduit mounted in the container, the inflow of pressurized air through this valve and to the pipe causing the ball to move forwardly to close the discharge outlet of the pipe and the closing of the three-way valve to pressurized air and venting of the rear of the pipe to atmosphere causing the pressurized air in the tank to engage the front portion of the ball and move the ball to the rear of the pipe and uncover the discharge holes and outlet while substantially closing the conduit to a flow of pressurized air in the tank past the ball.

* * * * *